United States Patent
Spica

(10) Patent No.: US 11,675,542 B2
(45) Date of Patent: *Jun. 13, 2023

(54) DEDICATED DESIGN FOR TESTABILITY PATHS FOR MEMORY SUB-SYSTEM CONTROLLER

(71) Applicant: Micron Technology, Inc., Boise, ID (US)

(72) Inventor: Michael Richard Spica, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,787

(22) Filed: Dec. 8, 2021

(65) Prior Publication Data

US 2022/0100430 A1    Mar. 31, 2022

Related U.S. Application Data

(63) Continuation of application No. 16/804,117, filed on Feb. 28, 2020, now Pat. No. 11,231,879.

(51) Int. Cl.
```
G06F 13/28      (2006.01)
G06F 3/06       (2006.01)
G06F 13/16      (2006.01)
G06F 13/42      (2006.01)
```

(52) U.S. Cl.
CPC .......... *G06F 3/0659* (2013.01); *G06F 3/0653* (2013.01); *G06F 3/0679* (2013.01); *G06F 13/1673* (2013.01); *G06F 13/1678* (2013.01); *G06F 13/1684* (2013.01); *G06F 13/28* (2013.01); *G06F 13/42* (2013.01); *G06F 13/4282* (2013.01)

(58) Field of Classification Search
CPC ..... G06F 3/0659; G06F 13/42; G06F 13/4282
See application file for complete search history.

(56) References Cited

U.S. PATENT DOCUMENTS

| | | | |
|---|---|---|---|
| 8,677,306 B1 * | 3/2014 | Andreev | G06F 11/267 714/39 |
| 2016/0216330 A1 * | 7/2016 | Lenka | G01R 31/318516 |
| 2017/0131355 A1 * | 5/2017 | Johnson | G01R 31/318588 |
| 2021/0271414 A1 | 9/2021 | Spica | |

OTHER PUBLICATIONS

"Chinese Application Serial No. 202110219279.2, Response filed Mar. 7, 2022 to Examiner Telephone dated Mar. 1, 2022", w English Claims, 69 pgs.

* cited by examiner

*Primary Examiner* — Idriss N Alrobaye
*Assistant Examiner* — Ronald T Modo
(74) *Attorney, Agent, or Firm* — Schwegman Lundberg & Woessner, P.A.

(57) ABSTRACT

Command execution data is received. The command execution data comprises a block address corresponding to an functional component, a register identifier corresponding to a design for testability (DFT) register of the functional component, and command data. The command execution data is converted to a serial command. The serial command is committed to the DFT register of the functional component. A response to the serial command is received. The response is generated by the functional component based on the serial command. The response is converted to command response data and is provided to a testing sub-system.

20 Claims, 4 Drawing Sheets

DEDICATED DESIGN FOR TESTABILITY PATHS FOR MEMORY SUB-SYSTEM CONTROLLER

PRIORITY APPLICATION

This application is a continuation of U.S. application Ser. No. 16/804,117, filed Feb. 28, 2020, which is incorporated herein by reference in its entirety.

TECHNICAL FIELD

Example embodiments of the disclosure relate generally to memory sub-systems and, more specifically, to dedicated design for testability (DFT) paths for a memory sub-system controller.

BACKGROUND

A memory sub-system can include one or more memory devices that store data. The memory components can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
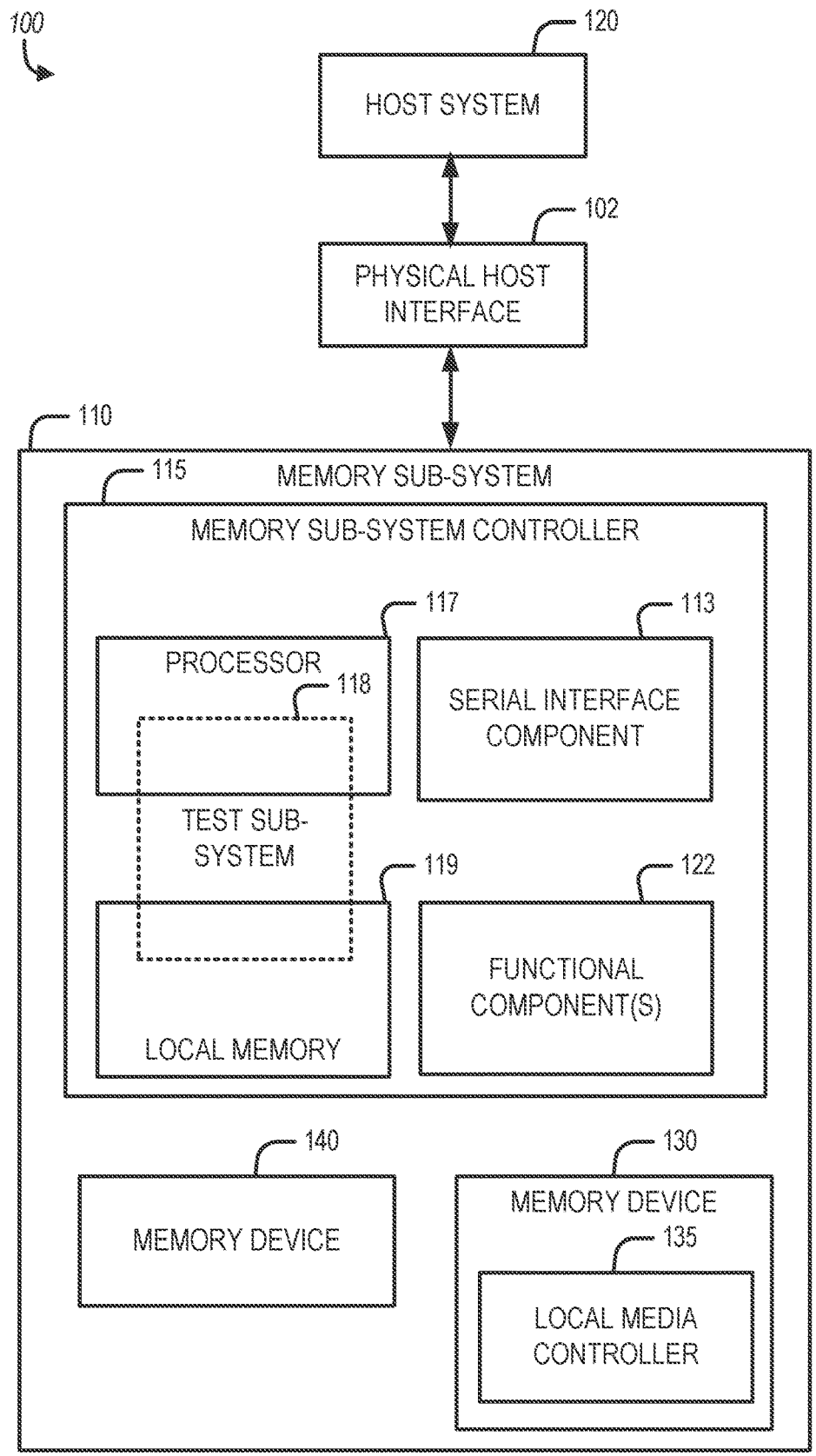
FIG. 1 illustrates an example computing system that includes a memory sub-system, in accordance with some embodiments of the present disclosure.

Aspects of the present disclosure are directed to dedicated DFT paths to facilitate testing and debugging of a printed circuit board (PCB) mounted memory sub-system controller. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device. Other examples of non-volatile memory devices are described below in conjunction with FIG. 1. Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

The memory sub-system can include a memory sub-system controller that can communicate with the memory devices of the memory sub-system to perform operations such as reading data, writing data, or erasing data at the memory devices and other such operations. The memory sub-system controller (referred to hereinafter simply as a "controller") can receive commands or operations from the host system and can convert the commands or operations into instructions or appropriate commands to achieve the desired access to the memory devices. Predesigned functional components are often used as building blocks in conventional memory sub-system controller designs to perform specific functions. As used herein, a "functional component" includes a physical implementation of a reusable unit of logic, cell or integrated circuit (IC) layout design.

Typically, these predesigned functional components include a functional interface that is register mapped or memory mapped by a memory sub-system controller to be utilized. There are, however, certain features of functional components that can only be accessible via alternative test and debug interfaces. Conventionally, a memory sub-system controller accesses these test and debug interfaces using a command status register (CSR) that is mapped to internal DFT registers of the functional component. For example, physical layer (PHY) functional components typically have lower level access information for test and debug that are available to a testing sub-system via a serial bus such as an inter-integrated circuit (I2C) component.

However, the register mapping utilized by the memory sub-system controller can be incomplete (for example, if the documentation for the functional component is incomplete). Accessing these test and debug interfaces via register mapping techniques can also be problematic because the registers are not being natively accessed. Additionally, mapping a memory sub-system controller's CSR to each functional component in the memory sub-system controller requires a high amount of wiring that can lead to wire congestion issues during chip layout.

Aspects of the present disclosure address the above and other deficiencies of conventional controller designs by using dedicated DFT paths that utilize custom serial interface components. For example, a memory sub-system controller can include one or more functional components connected via a two-wire connection to a serial interface component (e.g., an I2C bus). A testing sub-system (e.g., testing firmware) of the memory sub-system controller can commit command execution data to the serial interface component. For example, the serial interface component can include a command status register and the testing sub-system can write the command data to the command status register. The command data can specify a block address corresponding to a target functional component, a register identifier corresponding to a DFT register in the target functional component, and command data. The command data is converted at the serial interface component to a serial command and the serial interface component supplies the serial command to the DFT register of the target functional component. To this end, the serial interface component can include a buffer to perform conversion of the command execution data to the serial command, which can include converting command data from a parallel communication protocol (e.g., Advanced High-Performance Bus (AHB) protocol) to a serial communication protocol (e.g., I2C protocol). The target functional component provides a response to the command back to the testing sub-system via the serial interface component. As an example, command response data can be written to the command status register accessible by the testing sub-system.

It shall be appreciated that the dedicated DFT paths described above and herein can be utilized to avoid verification errors and reduce overall signal routing and chip area in memory sub-system controller designs. For example, functional component DFT registers are typically 16, 32, and 64 bit wide and conventional memory sub-system controller designs utilize as many wires as bits in register mapping the controller to the DFT registers of the functional components. By utilizing dedicated DFT paths as described herein, a memory sub-system controller can reduce the wire count to two for each functional component. Additionally, utilization of these dedicated DFT paths serves to standardize functional component DFT interfaces to a well-established protocol. Moreover, the memory system controller design described herein enables native access to functional component DFT functionality without using special external connection points.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a host interface 102. Examples of a host interface 102 include, but are not limited to, a serial advanced technology attachment (SATA) interface, a peripheral component interconnect express (PCIe) interface, USB interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The host interface 102 can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The host interface 102 can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 and convert responses associated with the memory devices 130 and/or the memory device 140 into information for the host system 120.

As shown, the memory sub-system controller 115 includes one or more functional components 122. Each of the functional components 122 includes a set of DFT registers to facilitate testing of the component. Each of the functional components 122 is associated with a unique block address and the set of DFT registers in each of the functional components 122 is associated with a register identifier.

The functional components 122 are each connected to a serial interface component 113 via a two-wire connection. The functional components 122 can be connected to the serial interface component 113 via an internal connection (e.g., a bus connection) as well as an external connection (e.g., a PCB connection).

A testing sub-system 118 (e.g., test firmware) performs testing of the memory sub-system controller 115 including the functional components 122. The testing sub-system 118 can include hardware (e.g., processing device, circuitry, dedicated logic, programmable logic, microcode, hardware of a device, integrated circuit, etc.), software (e.g., instructions run or executed on a processing device), or a combination thereof. As an example, the testing sub-system 118 can correspond to test firmware executed by the processor 117 and stored in the local memory 119 or one of the memory devices 130 or 140.

In testing one of the functional components 122, the testing sub-system 118 can use the serial interface component 113 to issue test commands to a target functional component via a large width bus connection (e.g., 16, 32, or 64-bit AHB, control access bus, or CSR bus mapping) to the serial interface component 113. The testing sub-system 118 can include a bus controller that includes a register or memory mapping to one or more registers of the serial interface component 113. The testing sub-system 118 can issue commands to any one of the functional components 122 by providing command execution data to the serial interface component 113. The testing sub-system 118 can utilize a parallel communication protocol to send the command execution data to the serial interface component 113. The command execution data can include a block address identifying a target functional component from among the functional components 122, one or more register identifiers corresponding to register in the target functional component, command data, and an indication that the command data is to be written to the one or more registers of the target functional component.

Command execution data received at the serial interface component 113 is converted to a serial command. In converting the command execution data to the serial command, the serial interface component 113 converts the command data from the parallel communication protocol to a serial communication protocol.

The serial interface component 113 commits the command to the identified register(s) of the target functional component corresponding to the block address in the command execution data. The target functional component can provide a response to a command back to the testing sub-system 118 by serially sending a response to the serial interface component 113 via the two-wire connection. The response can include a block address corresponding to the serial interface component 113, a register identifier corresponding to one or more registers of the serial interface component 113, and response data. The serial interface component 113 converts the response to command response data that can be read by the testing sub-system 118.

The serial interface component 113 can include at least one buffer for handling the protocol conversions between read and write operations to and from the target functional component. That is, the buffer converts the command execution data to the serial command and converts the serial response to command response data. The buffer can be sized to prevent data overrun associated with clock domain differences between the serialized communication and operation of the testing sub-system 118.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with the memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

Although FIG. 1 illustrates the testing sub-system 118, serial interface component 113, and the functional components 122 residing on the memory sub-system controller 115, it shall be appreciated that in other embodiments, these components can reside on the local media controller 135. Further, in some embodiments, the testing sub-system 118, serial interface component 113, and the functional components 122 can be implemented within both the memory sub-system controller 115 and the local media controller 135.

Figure 2:
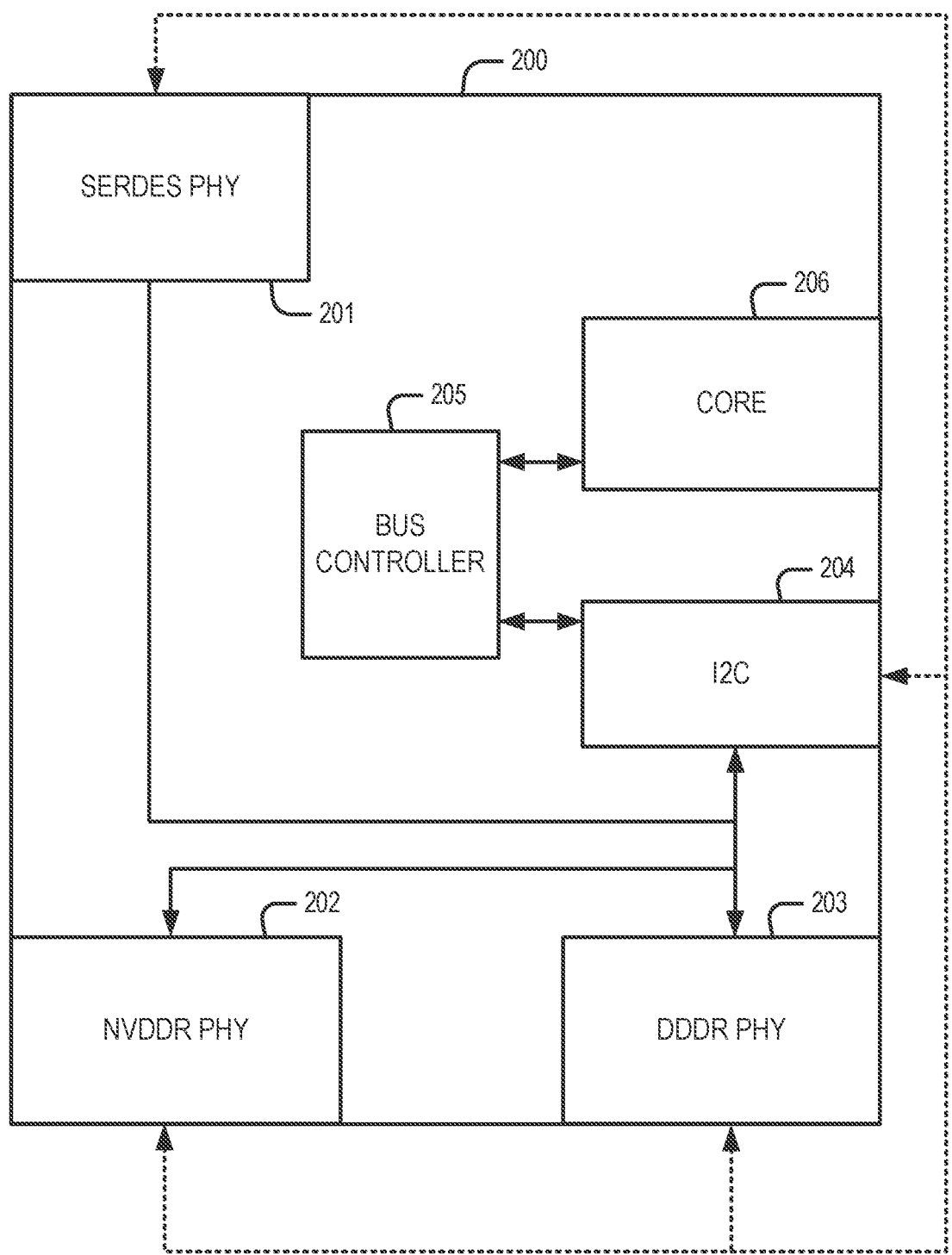
FIG. 2 illustrates a memory sub-system controller with dedicated DFT paths, which can be included in the memory sub-system, in accordance with some embodiments of the present disclosure.

With reference to FIG. 2, a physical layout of an example memory sub-system controller 200 on a PCB is illustrated, in accordance with some embodiments. The memory sub-system controller 200 is an example of the memory sub-system controller 115 of FIG. 1. The memory sub-system controller 200 includes multiple functional components—a Serializer/Deserializer (SERDES) PHY 201, a non-volatile double data rate (NVDDR) PHY 202, and a DRAM double data rate (DDDR) 203. Each of the components 201-203 is an example of the functional components 122 of FIG. 1. Each of the components 201-203 can include a set of DFT registers for use in testing the components 201-203. A unique block address is associated with each of the components 201-203 and a register identifier is associated with DFT registers of each of the components 201-203.

The components 201-203 are each connected to an I2C 204 via a two-wire connection. As shown, each of the components 201-203 can be connected to the I2C 204 via an internal connection (e.g., a bus connection) as well as an external connection (e.g., a PCB connection).

A bus controller 205 facilitates data exchanges between a core 206 (e.g., processor 117) and the I2C 204 via connections to a large width bus (e.g., 16, 32, or 64 bit). As an example, the bus controller 205 can include an AHB, a control access bus, or a CSR bus mapping. The core 206 can be configured by machine-readable instructions (e.g., by testing firmware) to be or include a testing system and the testing system can issue commands to any one of the components 201-203 by providing command execution data to the I2C 204. The command execution data can include a block address identifying a target functional component from among the components 201-203, one or more register identifiers corresponding to target functional component, and command data to be written to the one or more registers of the target functional component.

Command execution data sent to the I2C 204 is converted to a serial command, and the I2C 204 commits the command to the identified register(s) of the target functional component corresponding to the block address in the command execution data. The target functional component can provide a response to a command back to the testing sub-system (e.g., executing by the core 206) by serially sending a response to the I2C 204 via the two-wire connection. A response received by the I2C 204 can be converted to command response data that can be read by the testing sub-system.

The controller 200 may include a buffer for handling register conversions between read and write operations to and from the target functional component. That is, the buffer converts the command execution data to the serial command and converts the serial response to command response data. The buffer can be sized to prevent data overrun associated with clock domain differences between the serialized communication and operation of the core 206 clock. The buffer can, for example, be combined with the I2C 204 to form the serial interface component 113.

To avoid obscuring the inventive subject matter with unnecessary detail, various components and other details that are not germane to conveying an understanding of the inventive subject matter have been omitted from FIG. 2. As such, a skilled artisan will readily recognize that various additional functional components that may be included within the context of FIG. 2 to facilitate additional functionality that are not specifically described herein.

Figure 3:
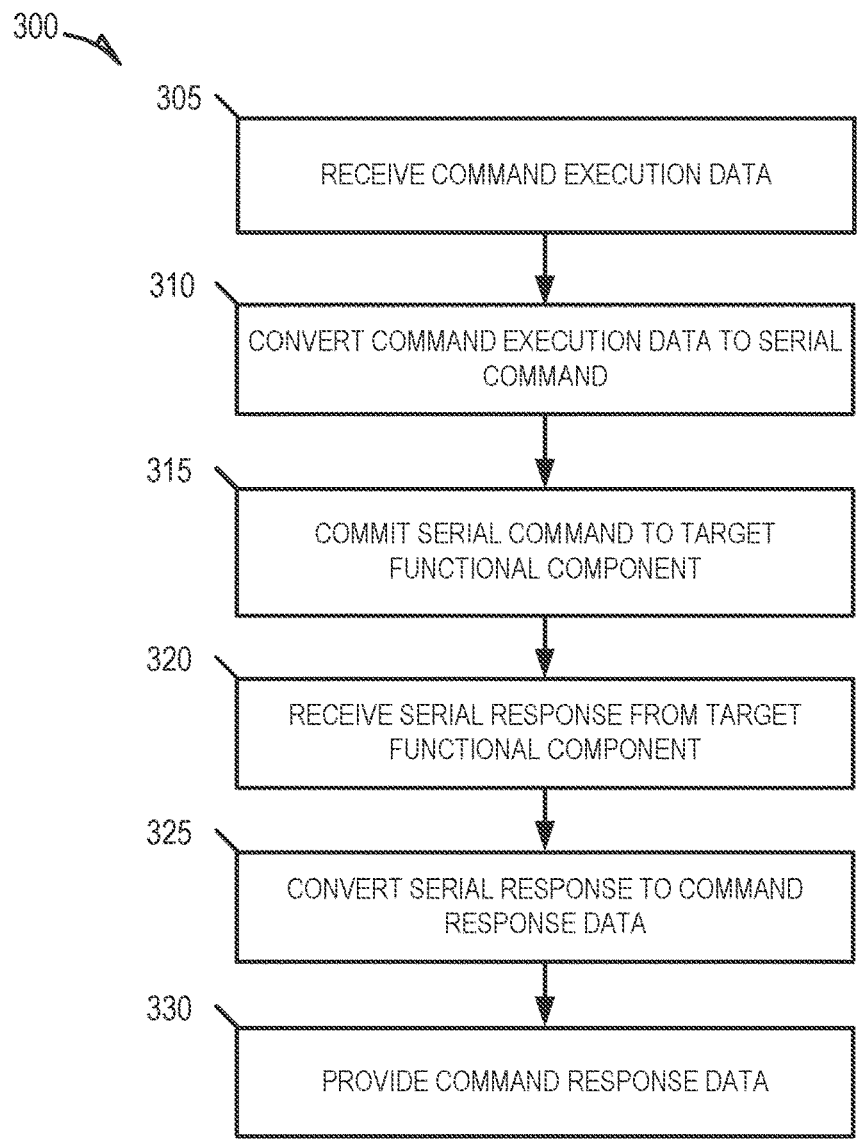
FIG. 3 is a flow diagram of an example method to facilitate test and debug of a memory sub-system using dedicated DFT paths, in accordance with some embodiments of the present disclosure

FIG. 3 is flow diagrams of an example method 300 to facilitate test and debug of a memory sub-system on a PCB using dedicated DFT paths, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the serial interface component 113. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device receives command execution data from a testing sub-system (e.g., the testing sub-system 118). The command execution data can identify a target functional component and a target register (e.g., a DFT register) and can include command data to be written to the target register of the target functional component. The command execution data can identify the target functional component using a unique block address associated with the functional component and can identify the target register using a register identifier associated with the target register. The testing sub-system communicates the command execution data to the processing device via a large width bus connection (e.g., an AHB connection) using a parallel communication protocol. In some embodiments, the processing device can include a command status register that is accessible by the testing sub-system, and in communicating the command execution data to the processing device, the testing sub-system can write the command execution data to the command status register.

At operation 310, the processing device converts the command execution data to a serial command. In converting the command execution data to the serial command, the processing device converts the command data from the parallel communication protocol to a serial communication protocol. For example, the processing device can convert the command data from an AHB protocol to an inter-integrated circuit (I2C) protocol. The processing device, can, for example, include a hardware buffer to perform conversions between the parallel communication protocol and the serial communication protocol.

At operation 315, the processing device commits the serial command to the target functional component using the serial communication protocol. In providing the serial command to the target functional component, the processing device writes the command to the target register of the target functional component.

The command, when written to the target register of the target functional component, can cause the target functional component to generate response data to the command. At operation 320, the processing device receives a serial response from the target functional component. The response includes the response data. The target functional component can provide the response using the serial communication protocol.

At operation 325, the processing device converts the serial response to command response data. That is, the processing device converts response data from the serial communication protocol to the parallel communication protocol. As noted above, the processing device can include a buffer to perform this conversion.

At operation 330, the processing device provides access to the command response data to the testing sub-system using the parallel communication protocol. In providing the command response data, the processing device can write the command response data to a set of registers that can be read by the testing sub-system. In embodiments in which the processing device includes a command status register accessible by the testing sub-system, the processing device can write the command response data to the command status register to provide the command response data to the testing sub-system.

EXAMPLES

Example 1 is a memory sub-system controller comprising: an functional component comprising a design for testability (DFT) register; and a processing device operatively connected to the functional component via a two-wire connection, the processing device to perform operations comprising: receiving command execution data from a testing sub-system, the command execution data comprising a block address corresponding to the functional component, a register identifier corresponding to the DFT register, and command data; converting the command execution data to a serial command; committing the serial command to the DFT register of the functional component; receiving a response to the serial command generated by the functional component based on the serial command; converting the response to command response data; and providing the command response data to the testing sub-system.

Example 2 comprises the subject matter of Example 1, wherein the processing device optionally comprises a command status register; the testing sub-system optionally communicates the command execution data to the processing device by writing the command execution data to the command status register; and the processing device optionally provides the command response data to the testing sub-system by writing the command response data to the command status register Example 3 comprises the subject matter of any one of Examples 1 and 2, wherein the testing sub-system communicates the command execution data to the processing device using a parallel communication protocol.

Example 4 comprises the subject matter of any one of Examples 1-3, wherein: the converting of the command execution data to the serial command optionally comprises converting the command data from the parallel communication protocol to a serial communication protocol; and the converting of the response to the command response data optionally comprises converting response data from the serial communication protocol to the parallel communication protocol.

Example 5 comprises the subject matter of any one of Examples 1-4, wherein the processing device optionally comprises at least one buffer to: convert the command data from the parallel communication protocol to the serial communication protocol; and convert the response data from the serial communication protocol to the parallel communication protocol.

Example 6 comprises the subject matter of any one of Examples 1-5, wherein the parallel communication protocol comprises an AHB protocol; and the serial communication protocol comprises inter-integrated circuit (I2C) protocol.

Example 7 comprises the subject matter of any one of Examples 1-6, wherein: the processing device optionally comprises an I2C; and the testing sub-system is optionally operatively coupled to the processing device via an AHB bus connection.

Example 8 comprises the subject matter of any one of Examples 1-7, wherein the processing device is optionally operatively connected to a plurality of functional components via a two-wire connection, each functional component being associated with a unique block address.

Example 9 is a method comprising: receiving, at a serial interface component of a memory sub-system controller, command execution data from a testing sub-system of the memory sub-system controller, the command execution data comprising: a block address corresponding to a target functional component from among a plurality of functional components connected to the serial interface component via a two-wire connection, the target functional component comprising a DFT register; a register identifier corresponding to the DFT register, and command data; converting the command execution data to a serial command; committing the serial command to the DFT register of the target functional component; receiving a response to the serial command generated by the target functional component based on the serial command; converting the response to command response data; and providing the command response data to the test sub-system.

Example 10 comprises the subject matter of any one of Examples 1-9, wherein the serial interface component optionally comprises a command status register accessible by the testing sub-system; the testing sub-system optionally communicates the command execution data to the serial interface component by writing the command execution data to the command status register; and the providing of the command response data optionally comprises writing the command response data to the command status register.

Example 11 comprises the subject matter of any one of Examples 9 or 10, wherein the converting of the command execution data to the serial command optionally comprises converting the command data from a parallel communication protocol to a serial communication protocol; and the converting of the response to the command response data optionally comprises converting response data from the serial communication protocol to the parallel communication protocol.

Example 12 comprises the subject matter of any one of Examples 9-11, wherein the serial interface optionally comprises an I2C operatively connected to multiple functional components via a two-wire connection.

Example 13 comprises the subject matter of any one of Examples 9-12, wherein the command execution data is optionally received via a large width bus connection to the testing sub-system and is communicated using a parallel communication protocol.

Example 14 comprises the subject matter of any one of Examples 9-13, wherein the command execution data is optionally received via an advanced AHB bus connection.

Example 15 comprises the subject matter of any one of Examples 9-14 wherein: the parallel communication protocol optionally comprises a AHB protocol; and the serial communication protocol optionally comprises inter-integrated circuit (I2C) protocol.

Example 16 is a non-transitory computer-readable storage medium comprising instructions that, when executed by a processing device, configure the processing device to perform operations comprising: receiving, at a serial interface component of a memory sub-system controller, command execution data from a testing sub-system of the memory sub-system controller, the command execution data comprising: a block address corresponding to a target functional component from among a plurality of functional components connected to the serial interface component via a two-wire connection, the target functional component comprising a DFT register; a register identifier corresponding to the DFT register and command data; converting the command execution data to a serial command; committing the serial command to the DFT register of the target functional component; receiving a response to the serial command generated by the target functional component based on the serial command; converting the response to command response data; and providing the command response data to the test sub-system.

Example 17 comprises the subject matter of Example 16 wherein the command execution data is optionally communicated to the processing device using a parallel communication protocol.

Example 18 comprises the subject matter of any one of Examples 16 or 17, wherein: the converting of the command execution data to the serial command optionally comprises converting the command data from the parallel communication protocol to a serial communication protocol; and the converting of the response to the command response data optionally comprises converting response data from the serial communication protocol to the parallel communication protocol.

Example 19 comprises the subject matter of any one of Examples 16-18, wherein: the parallel communication protocol comprises a AHB protocol; and the serial communication protocol comprises inter-integrated circuit (I2C) protocol.

Example 20 comprises the subject matter of any one of Examples 16-19, wherein the receiving of the command execution data optionally comprises accessing the command execution data from the command status register; and the providing of the command response data optionally comprises writing the command response data to the command status register.

Figure 4:
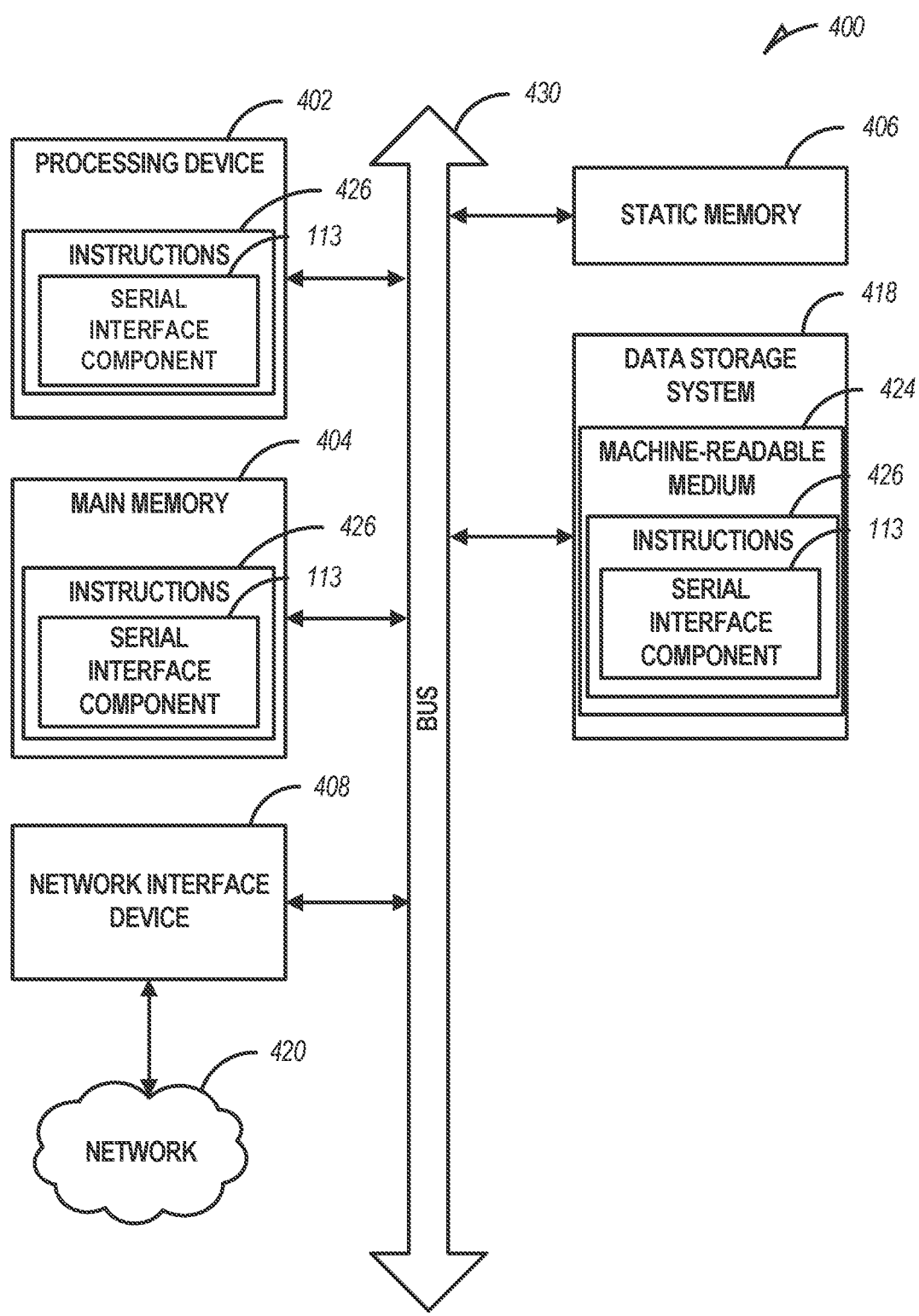
FIG. 4 is a block diagram of an example computer system in which embodiments of the present disclosure may operate.

FIG. 4 illustrates an example machine in the form of a computer system 400 within which a set of instructions can be executed for causing the machine to perform any one or more of the methodologies discussed herein. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the serial interface component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., ROM, flash memory, DRAM such as SDRAM or Rambus DRAM (RDRAM), etc.), a static memory 406 (e.g., flash memory, static random access memory (SRAM), etc.), and a data storage system 418, which communicate with each other via a bus 430.

The processing device 402 represents one or more general-purpose processing devices such as a microprocessor, a central processing unit, or the like. More particularly, the processing device 402 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 402 can also be one or more special-purpose processing devices such as an ASIC, an FPGA, a digital signal processor (DSP), a network processor, or the like. The processing device 402 is configured to execute instructions 426 for performing the operations and steps discussed herein. The computer system 400 can further include a network interface device 408 to communicate over a network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a security component (e.g., the testing sub-system 118 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; RAMs; erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., a computer-readable) storage medium such as a ROM, a RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

The invention claimed is:

1. A memory sub-system controller comprising:
  a plurality of functional components, each functional component being associated with a unique block address; and
  a processing device operatively connected to the plurality of functional components, the processing device to perform operations comprising:
    receiving command execution data from a testing sub-system, the command execution data specifying a target functional component from among the plurality of functional components and a target design for testability (DFT) register from among a set of DFT registers in the target functional component;
    writing a command to the target DFT register of the target functional component based on the command execution data;
    receiving a response to the command generated by the target functional component based on the command; and
    providing response data to the testing sub-system based on the response.

2. The memory sub-system controller of claim 1, wherein the command execution data comprises:
  a block address that identifies the target functional component from among the plurality of functional components; and
  a register identifier that identifies the target register from among the set of DFT registers in the target functional component.

3. The memory sub-system controller of claim 1, wherein:
  the processing device comprises a command status register;
  the testing sub-system communicates the command execution data to the processing device by writing the command execution data to the command status register; and the processing device provides the command response data to the testing sub-system by writing the command response data to the command status register.

4. The memory sub-system controller of claim 1, wherein the testing sub-system communicates the command execution data to the processing device using a parallel communication protocol.

5. The memory sub-system controller of claim 4, wherein the operations further comprise:
converting the command data from the parallel communication protocol to a serial communication protocol; and
converting the response data from the serial communication protocol to the parallel communication protocol.

6. The memory sub-system controller of claim 5, wherein the processing device comprises at least one buffer to:
convert the command data from the parallel communication protocol to the serial communication protocol; and
convert the response data from the serial communication protocol to the parallel communication protocol.

7. The memory sub-system controller of claim 5, wherein:
the parallel communication protocol comprises an Advanced High-Performance Bus (AHB) protocol; and
the serial communication protocol comprises inter-integrated circuit (I2C) protocol.

8. The memory sub-system controller of claim 7, wherein:
the processing device comprises an I2C component; and
the testing sub-system is operatively coupled to the processing device via an AHB bus connection.

9. The memory sub-system controller of claim 1, wherein writing the command to the target DFT register causes the target functional component to provide the response.

10. A method comprising:
receiving, at a serial interface component of a memory sub-system controller, command execution data from a testing sub-system of the memory sub-system controller, the command execution data specifying a target functional component from among a plurality of functional components of the memory sub-system controller and a target design for testability (DFT) register from among a set of DFT registers in the target functional component;
writing a command to the target DFT register of the target functional component based on the command execution data;
receiving a response to the command generated by the target functional component based on the command; and
providing response data to the testing sub-system based on the response.

11. The method of claim 10, wherein the command execution data comprises:
a block address that identifies the target functional component from among the plurality of functional components; and
a register identifier that identifies the target register from among the set of DFT registers in the target functional component.

12. The method of claim 10, further comprising:
converting the command execution data to a serial command, wherein writing the command to the target DFT register comprises writing the serial command to the target DFT register; and
converting the response to the command response data.

13. The method of claim 12, wherein:
the converting of the command execution data to the serial command comprises converting the command data from a parallel communication protocol to a serial communication protocol; and
the converting of the response to the command response data comprises converting response data from the serial communication protocol to the parallel communication protocol.

14. The method of claim 13, wherein:
the parallel communication protocol comprises an AHB protocol; and
the serial communication protocol comprises inter-integrated circuit (I2C) protocol.

15. The method of claim 10, wherein the serial interface component comprises an I2C component operatively connected to multiple functional components via a two-wire connection.

16. A non-transitory computer-readable storage medium comprising instructions that, when executed by a processing device, configure the processing device to perform operations comprising:
receiving, at a serial interface component of a memory sub-system controller, command execution data from a testing sub-system of the memory sub-system controller, the command execution data specifying a target functional component from among a plurality of functional components of the memory sub-system controller and a target design for testability (DFT) register from among a set of DFT registers in the target functional component;
writing a command to the target DFT register of the target functional component based on the command execution data;
receiving a response to the command generated by the target functional component based on the command; and
providing response data to the testing sub-system based on the response.

17. The non-transitory computer-readable storage medium of claim 16, wherein:
the command execution data is communicated to the processing device using a parallel communication protocol; and
the response is provided to the processing device using a serial communication protocol.

18. The non-transitory computer-readable storage medium of claim 17, wherein:
the parallel communication protocol comprises an advanced high-performance bus (AHB) protocol; and
the serial communication protocol comprises inter-integrated circuit (I2C) protocol.

19. The non-transitory computer-readable storage medium of claim 18, wherein the serial interface component comprises an I2C component operatively connected to multiple functional components via a two-wire connection.

20. The non-transitory computer-readable storage medium of claim 16, wherein:
the receiving of the command execution data comprises accessing the command execution data from a command status register; and
the providing of the command response data comprises writing the command response data to the command status register.

* * * * *